US012508455B2

(12) United States Patent
Koutsos

(10) Patent No.: US 12,508,455 B2
(45) Date of Patent: Dec. 30, 2025

(54) GAS-OPERATED VALVE

(71) Applicant: REACTON FIRE SUPPRESSION LTD., Chelmsford (GB)

(72) Inventor: Theodoros Koutsos, Chelmsford (GB)

(73) Assignee: REACTON FIRE SUPPRESSION LTD., Chelmsford (GB)

( * ) Notice: Subject to any disclaimer, the term of this patent is extended or adjusted under 35 U.S.C. 154(b) by 341 days.

(21) Appl. No.: 18/554,275

(22) PCT Filed: Mar. 15, 2022

(86) PCT No.: PCT/GB2022/050658

§ 371 (c)(1),
(2) Date: Oct. 6, 2023

(87) PCT Pub. No.: WO2022/214779

PCT Pub. Date: Oct. 13, 2022

(65) Prior Publication Data

US 2024/0261614 A1 Aug. 8, 2024

(30) Foreign Application Priority Data

Apr. 8, 2021 (EP) .................................... 21386024
May 27, 2021 (GB) .................................... 2107554

(51) Int. Cl.
*A62C 35/68* (2006.01)
*A62C 37/48* (2006.01)

(52) U.S. Cl.
CPC .............. *A62C 35/68* (2013.01); *A62C 37/48* (2013.01)

(58) Field of Classification Search
CPC ......... A62C 35/68; A62C 37/11; A62C 37/46; A62C 37/48; F16K 31/1223
See application file for complete search history.

(56) References Cited

U.S. PATENT DOCUMENTS

| | | | | |
|---|---|---|---|---|
| 5,575,338 A * | 11/1996 | Sundholm | A62C 35/68 | |
| | | | 169/22 | |
| 5,653,291 A * | 8/1997 | Sundholm | A62C 35/68 | |
| | | | 137/113 | |
| 5,954,138 A * | 9/1999 | Gabriel | A62C 35/68 | |
| | | | 137/72 | |
| 2012/0152571 A1 | 6/2012 | Andreas | | |
| 2016/0339282 A1* | 11/2016 | Melton | A62C 35/68 | |

FOREIGN PATENT DOCUMENTS

WO 2018185484 A1 10/2018

OTHER PUBLICATIONS

International Search Report mailed May 30, 2022, in corresponding International Application No. PCT/GB2022/050658, 4 pages.
Written Opinion of the International Searching Authority mailed May 30, 2022, in corresponding International Application No. PCT/GB2022/050658, 7 pages.
Search Report issued Jan. 21, 2022, in corresponding Great Britain Application No. GB2107554.4, 1 page.

* cited by examiner

*Primary Examiner* — Tuongminh N Pham
(74) *Attorney, Agent, or Firm* — Maier & Maier, PLLC

(57) ABSTRACT

A gas-operated valve for use in a fire suppression system, a fire suppression system comprising the gas-operated valve of the invention, and a method for operating the fire suppression system.

15 Claims, 3 Drawing Sheets

SECTION D-D

GAS-OPERATED VALVE

FIELD

The present invention relates to a gas-operated valve for use in a fire suppression system, a fire suppression system comprising the gas-operated valve of the invention, and a method for operating the fire suppression system of the invention.

BACKGROUND

Fire suppression systems can either be manually or automatically activated. An example of an automatic system is a sprinkler system that is activated in response to detection of heat. The system is defined by a network of water pipes suspended from the ceiling of a building interspersed by a plurality of sprinkler heads. Each sprinkler head has a plug which is designed to burst or melt in response to application of heat. In this way, the system is effective at dousing a localised fire by way of activation of one, or a few sprinkler heads, or a larger fire through activation of multiple sprinkler heads.

Sprinkler systems typically use water as medium, but water is not appropriate for fighting all types of fire. In the event of an electrical fire, application of water to the fire would potentially cause the fire to spread further. Furthermore, a sprinkler head is only activated following heating of the temperature sensitive plug by hot gases generated in the event of a fire. The hot gases would therefore have to be relatively localised in order to activate a sprinkler head thus potentially resulting in a delay between a fire taking hold and activation of the fire suppression system.

For applications such as electrical cabinets where it is desirable to directly target a point of ignition, systems that provide a direct path inside the electrical cabinet are known. Such systems use a heat sensitive tube which is designed to burst when it reaches a certain temperature. When the tube bursts, a fire suppression material is dispersed directly from the point of burst onto the affected area of the electrical cabinet thus addressing the source of heat directly.

An example of a larger system where use of water might not be desirable is a pneumatic system that utilises a run of heat sensitive tube in the vicinity of equipment to be protected. The tubing is connected to a cylinder containing a fire suppression material. When the tubing bursts, the system loses pressure and causes the cylinder to deliver a fire suppression material to a plurality of valves that are not directly connected to the tubing. The pressure of the fire suppression material causes a cap to blow off each valve so that the fire suppression material can be delivered to the source of the fire. Such systems are effective at fighting a fire in either a specific area or over a broader area but the response time can be diminished by the system first having to detect that pressure has been lost due to burst tubing before delivering a fire suppression material through a separate tube or pipe network to the heat sensitive tubing.

Some pneumatic systems also provide a manual actuator which causes pneumatic pressure in the system to drop when actuated. A manual actuator provides means for an operator to quickly deploy the fire suppression system in the event of a fire rather than waiting for the temperature sensitive tubing to burst.

For effectively extinguishing a fire, it is necessary for the fire suppression system to operate at a sufficiently high pressure to, for example, release water from a system of sprinkler heads at a sufficiently high rate of volume. Furthermore when powder or foam is used as a fire suppression material, in order to release a sufficient volume of powder or foam at the source of fire in a given period of time, the fire suppression system must operate at high pressure, for example 20-200, 20-150, 20-100, 25-75, 25-65, 25-60, 25-40 bar gauge.

The present invention seeks to address the aforementioned problems.

WO 2018/185484 (Reacton Fire Suppression Limited) discloses an automatic valve comprising a body configured to receive a piston axially therein, the piston being movable within the body between a first axial position in which the piston is configured to seal a valve opening when pneumatic pressure is applied to the piston and a second axial position in which the piston is configured to be withdrawn from the valve opening such that a fire suppression agent can enter the valve body through the valve opening, wherein the piston comprises a channel longitudinally therethrough and a check valve positioned within the channel such that fluid can enter the check valve in a first longitudinal direction but not in a second longitudinal direction.

SUMMARY

In a first aspect of the invention, a gas-operated valve for a fire suppression system is provided, the gas-operated valve comprising a body, a piston, and an integrated plug valve,

- the body configured to receive the piston axially therein,
- the piston being movable within the body between a first axial position in which the piston is configured to seal a valve opening when pneumatic pressure provided by a non-flammable gas is applied to the piston and a second axial position in which the piston is configured to be withdrawn from the valve opening such that a pressurised fire suppression material can enter the body through the valve opening,
- wherein the piston comprises a machined flange which defines volumes for non-flammable gas and pressurised fire suppression material respectively separated by the machined flange,
- the integrated plug valve configured to control application and release of the pneumatic pressure and indirectly discharge of the fire suppression material,
- wherein the plug valve comprises a rotatable plug comprising a stem with a transverse bore for passage of the non-flammable gas, a blind bore in the body configured to receive the stem, and a stem seal between the stem and blind bore providing a fluid-tight seal between the stem and the blind bore thereby to prevent reduction of the pneumatic pressure by escape of the non-flammable gas between the stem and blind bore and allowing the stem to rotate within the blind bore,
- wherein the blind bore comprises at least one or two annular grooves on an inside surface of the blind bore for receiving a portion of the stem seal thereby providing a further fluid-tight seal.

In a second aspect of the invention, a fire suppression system is provided, the fire suppression system comprising a gas-operated valve according to the first aspect of the invention, a detection means for detecting the presence of a fire or abnormal heat, a non-flammable gas source for maintaining the gas-operated valve in a normal operating condition, a source of fire suppression material connected to the gas-operated valve, and tubing or pipework for delivering fire suppression material to the source of fire,

- wherein detection of a fire or abnormal heat by the detection means automatically causes non-flammable gas pressure in the gas-operated valve to be reduced or removed resulting in release of the fire suppression material from the source of the fire suppression material to the gas-operated valve and thence via the tubing or pipework for delivering fire suppression material to the source of fire or heat.

In a third aspect of the invention, a method of operating a fire suppression system is provided, the method comprising the step of providing a fire suppression system comprising a gas-operated valve according to the first aspect of the invention, a temperature sensitive detection means for detecting the presence of a fire or abnormal heat, a non-flammable gas source for maintaining the gas-operated valve in a normal operating condition, a source of fire suppression material connected to the gas-operated valve, and tubing or pipework for delivering fire suppression material to the source of fire, wherein detection of a fire or abnormal heat by the temperature sensitive detection means automatically causes non-flammable gas pressure in the gas-operated valve to be reduced or removed via the gas charge port resulting in release of the fire suppression material from the source of the fire suppression material to the gas-operated valve and thence via the tubing or pipework for delivering fire suppression material to the source of fire or heat, wherein the method comprises the further step of adjusting the position of the rotatable plug thereby to control the rate of loss of non-flammable gas and delay release of the fire suppression material from the source of the fire suppression material to the gas-operated valve and thence via the tubing or pipework for delivering fire suppression material to the source of fire or heat.

BRIEF DESCRIPTION OF THE FIGURES

The invention is described in more detail with reference to the following figures which show in.

DETAILED DESCRIPTION OF THE EMBODIMENTS

Figure 1A:
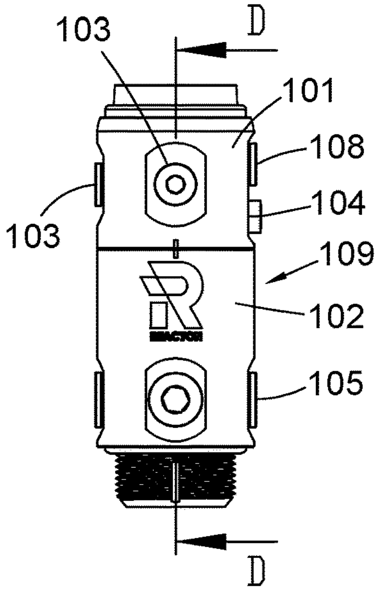
FIG. 1*a* is an external side view of one embodiment of the gas-operated valve of the invention.

In a first aspect of the invention, a gas-operated valve for a fire suppression system is provided, the gas-operated valve comprising a body, a piston, and an integrated plug valve, the body configured to receive the piston axially therein, the piston being movable within the body between a first axial position in which the piston is configured to seal a valve opening when pneumatic pressure provided by a non-flammable gas is applied to the piston and a second axial position in which the piston is configured to be withdrawn from the valve opening such that a pressurised fire suppression material can enter the body through the valve opening, wherein the piston comprises a machined flange which defines volumes for non-flammable gas and pressurised fire suppression material respectively separated by the machined flange, the integrated plug valve configured to control application and release of the pneumatic pressure and indirectly discharge of the fire suppression material, wherein the plug valve comprises a rotatable plug comprising a stem with a transverse bore for passage of the non-flammable gas, a blind bore in the body configured to receive the stem, and a stem seal between the stem and blind bore providing a fluid-tight seal between the stem and the blind bore thereby to prevent reduction of the pneumatic pressure by escape of the non-flammable gas between the stem and blind bore and allowing the stem to rotate within the blind bore, wherein the blind bore comprises at least one or two annular grooves on an inside surface of the blind bore for receiving a portion of the stem seal thereby providing a further fluid-tight seal.

Preferably the stem seal is formed from polytetrafluoroethylene (PTFE). The plug valve optionally comprises at least one O-ring seal providing a fluid-tight seal between the plug and a retaining nut for retaining the plug within the blind bore, preferably the plug valve comprises two O-ring seals.

The plug valve optionally further comprises a stop washer, wherein the stop washer comprises an inside edge which is partially facetted and partially curved adapted to cooperatively interact with a corresponding partially facetted and partially curved waist portion of the plug in such a manner that the plug rotates between two stop positions, wherein the stop washer further comprises a peripheral tab for preventing co-rotation of the combination of the plug and stop washer beyond the two end stop positions, the peripheral tab configured to lock into a recess on the exterior of the body.

The gas-operated valve optionally further comprises first and second hollow body parts, wherein the second hollow body part receives the piston, wherein a fluid-tight seal is achieved between the first and second hollow body parts by means of a screw fit comprising a male thread on the first hollow body part and a female thread on the second hollow body part, the second hollow body part further comprising first and second annular shoulders, and first and second O-ring seals disposed between the first and second hollow body parts where they mate at the first and second annular shoulders.

The gas-operated valve optionally further comprises a gas charge port for pressurising the gas-operated valve and for fitting heat sensitive burst tubing or pipework, or a sensor operated gas vent wherein the sensor can detect a fire, wherein the gas charge port is in fluid communication via a gas charge passage with the volume for non-flammable gas, wherein the plug valve controls passage of the non-flammable gas through the gas charge passage, wherein the gas-operated valve further comprises at least one pressurised material port for tubing or pipework for delivering fire suppression material to the source of fire, wherein the gas-operated valve optionally further comprises at least one gas port for heat sensitive burst tubing or pipework, or a sensor operated gas vent wherein the sensor can detect a fire, the gas port being in fluid communication with the volume for non-flammable gas.

The plug valve optionally comprises a stop washer for cooperating with the plug to limit rotation between the stop washer and plug between two stop positions, the stop washer comprising a peripheral tab for preventing co-rotation of the stop washer with the plug, the peripheral tab adapted to lock into a recess on the outside of the body.

In one embodiment of the invention, the piston can comprise a primary cylindrical shaft and a secondary cylindrical shaft separated by a machined flange including first and second planar faces and an annular recess configured to receive a first piston seal for providing a seal between the machined flange and the second hollow body part, wherein the piston additionally comprises a second piston seal provided on the primary cylindrical shaft providing a seal between the primary cylindrical shaft and a fourth annular shoulder of the second hollow body part located towards the valve opening when the piston is in the first axial position, wherein the piston additionally comprises a third piston seal on or around the secondary cylindrical shaft providing a seal between the secondary cylindrical shaft and the first hollow body part when the piston is in the second axial position, wherein the piston additionally comprises a fourth piston seal provided at the junction between the primary cylindrical shaft and the machined flange and providing a seal between the junction and a third annular shoulder of the second hollow body part when the piston is in the first axial position.

In one embodiment of the invention, the piston can also comprises a longitudinal axial passage for pressurisation of the fire suppression material, and optionally a one way check valve within the longitudinal axial passage which only enables fluids to pass through in one direction without impediment towards the valve opening and to pass back though the check valve only provided the difference in fluid pressure either side of the check valve exceeds a predetermined differential pressure. Once charged, only a small trickle of non-flammable gas may pass back through the longitudinal axial passage and check valve from the volume for pressurised fire suppression material to compensate for any loss of non-flammable gas from the volume for non-flammable gas through, for example, heat sensitive burst tubing or pipework, or sensor operated gas vents wherein the sensor can detect a fire or heat. The check valve further effectively prevents any fire suppression material from contaminating the volume for non-flammable gas and thence the heat sensitive burst tubing or pipework, or sensor operated gas vents wherein the sensor can detect a fire or heat.

In a preferred embodiment of the invention, at least one of the first and second O-ring seals, and/or the second, third and fourth piston seals are provided in an annular corner notch thereby providing an improved seal compared to a seal provided between two flat surfaces.

In another embodiment, the gas-operated valve further comprises a burst plug in fluid communication via a burst plug passage with the pressurised fire suppression material.

The gas-operated valve typically has an operating pressure range of 20-200, 20-150, 20-100, 25-75, 25-65, 25-60, 25-40 bar gauge.

In a second aspect of the invention, a fire suppression system is provided, the fire suppression system comprising a gas-operated valve according to the first aspect of the invention, a detection means for detecting the presence of a fire or abnormal heat, a non-flammable gas source for maintaining the gas-operated valve in a normal operating condition, a source of fire suppression material connected to the gas-operated valve, and tubing or pipework for delivering fire suppression material to the source of fire, wherein detection of a fire or abnormal heat by the detection means automatically causes non-flammable gas pressure in the gas-operated valve to be reduced or removed resulting in release of the fire suppression material from the source of the fire suppression material to the gas-operated valve and thence via the tubing or pipework for delivering fire suppression material to the source of fire or heat.

The detection means can be sensitive to heat or smoke.

In one embodiment, the fire suppression system of the invention provides at least two gas-operated valves in fluid communication in series each with a source of fire suppression material, wherein removal of non-flammable gas pressure in one gas-operated valve results in reduction or removal of non-flammable gas pressure in all the gas-operated valves.

In a third aspect of the invention, a method of operating a fire suppression system is provided, the method comprising the step of providing a fire suppression system comprising a gas-operated valve according to the first aspect of the invention, a temperature sensitive detection means for detecting the presence of a fire or abnormal heat, a non-flammable gas source for maintaining the gas-operated valve in a normal operating condition, a source of fire suppression material connected to the gas-operated valve, and tubing or pipework for delivering fire suppression material to the source of fire, wherein detection of a fire or abnormal heat by the temperature sensitive detection means automatically causes non-flammable gas pressure in the gas-operated valve to be reduced or removed via the gas charge port resulting in release of the fire suppression material from the source of the fire suppression material to the gas-operated valve and thence via the tubing or pipework for delivering fire suppression material to the source of fire or heat, wherein the method comprises the further step of adjusting the position of the rotatable plug thereby to control the rate of loss of non-flammable gas and delay release of the fire suppression material from the source of the fire suppression material to the gas-operated valve and thence via the tubing or pipework for delivering fire suppression material to the source of fire or heat.

FIG. 1*a* shows a side view of one embodiment of the gas-operated valve of the invention comprising a body (109), the body comprising first (101) and second (102) hollow body parts. The first hollow body part comprises gas ports (103) on the left and the front sides, the gas ports adapted, for example, for use with heat sensitive burst tubing or pipework, or a sensor operated gas vent wherein the sensor can detect fire or heat through, for example, heat or smoke detection, as part of a fire detection and suppression system. The first hollow body part is not limited to two gas ports. Indeed the first hollow body part does not need to comprise any gas ports. The upper limit for numbers of gas ports is limited only by the size of the gas ports relative to the size of the first hollow body part, but is typically two to four. The first hollow body part also comprises a gas charge port (108) on the upper right side which is used to pressurise the gas-operated valve and optionally for fitting of heat sensitive burst tubing or pipework, or a sensor operated gas vent wherein the sensor can detect a fire or heat.

FIG. 1*a* also shows an integrated plug valve (104) to the lower right side of the upper hollow body part and positioned directly below the gas charge port. Whilst it is not essential that the plug valve be positioned directly below the gas charge port, this is the preferred location for ease of manufacture.

The second hollow body part in FIG. 1*a* comprises pressurised material ports (105) on the left, right and front sides, the pressurised material ports adapted, for example, for use with tubing or pipework for delivering fire suppression material to the source of fire, as part of a fire detection and suppression system. The material is generally fire suppression material such as water, carbon dioxide or other gases, suitable foam or powder based material all of which are under pressure and which are well-known to the skilled person in the art. Preferably the fire suppression material is in the form of a liquid or powder. The second hollow body part must comprise at least one pressurised material port. The upper limit for numbers of pressurised material ports is limited only by the size of the pressurised material ports relative to the size of the second hollow body part, but is typically two to four.

At the bottom of the second hollow body part as shown in FIG. 1*a* is a valve opening (106) which provides fluid communication between the second hollow body part and a source of pressurised material (not shown), typically a pressurised cylinder of material.

Figure 1B:
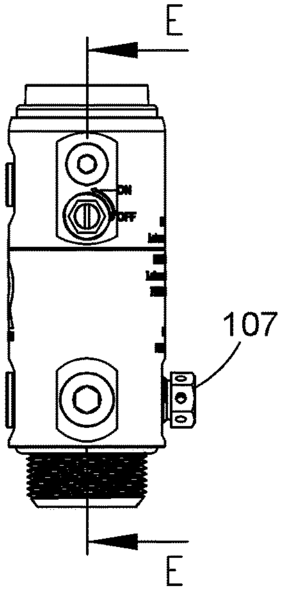
FIG. 1*b* is an external side view of one embodiment of the gas-operated valve of the invention which differs in being 90 degrees of rotation about a longitudinal axis apart of FIG. 1*a;*

FIG. 1*b* shows a side view of the embodiment of the gas-operated valve of the invention of FIG. 1*a* rotated about a longitudinal axis by 90 degrees (clock-wise when viewed from above) relative to FIG. 1*a* and thus shows many of the same features as FIG. 1*a*. FIG. 1*b* additionally shows a burst plug (107) on the right side of the second hollow body part.

Figure 2A:
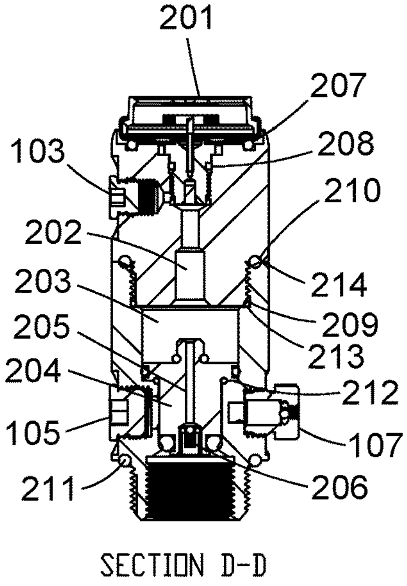
FIG. 2*a* is a longitudinal cross-sectional view of the embodiment of the gas-operated valve of the invention shown in FIG. 1*a* along the line D-D of FIG. 1*a;*

FIG. 2*a* shows a longitudinal cross-sectional view of the embodiment of the gas-operated valve of the invention shown in FIG. 1*a* along the line D-D of FIG. 1*a*. FIG. 2*a* shows an integrated pressure gauge (201) fitted in a top aperture of the first hollow body part, which pressure gauge is in fluid communication via a central passage (202) within the first hollow body part with a central chamber (203) in the second hollow body part. FIG. 2*a* also shows a gas port on the left side of the first hollow body part which (as with all gas ports) is also in fluid communication via the central passage within the first hollow body part with the central chamber in the second hollow body part.

FIG. 2*a* also shows a piston (204) which can move freely up and down along its vertical axis within the central passage. The piston comprises a longitudinal axial passage (205) therethrough and, optionally, a one-way check valve (206) positioned inside the longitudinal axial passage (205). The pressurised material port on the left side of the second hollow body part (as with all pressurised material port) is in fluid communication via the central chamber in the second hollow body part when access is not blocked by the piston with the source of pressurised material. The burst plug (107) on the right side of the second hollow body part is in fluid communication via two burst plug passages (not shown) with the source of pressurised material. Should the pressure of the material exceed a predetermined safe level, the pressure is automatically relieved through the burst plug.

FIG. 2*a* shows that the integrated pressure gauge engages with the top aperture of the first hollow body part by means of a screw fit via a male thread on the integrated pressure gauge and a female thread within the top aperture of the first hollow body part, with two O-ring seals (207, 208) at different interfaces between the underside of the pressure gauge and the top of the surface of the first hollow body part to provide a fluid-tight seal. FIG. 2*a* also shows that a fluid-tight seal is achieved between the first and second hollow body parts by means of a screw fit via a male thread on the underside of the first hollow body part and a female thread within a top aperture of the second hollow body part, with first and second O-ring seals (209, 210) at different interfaces between the underside of the first hollow body part and the first surface of the second hollow body part. In particular the second hollow body part has first and second annular shoulders (213, 214) towards the top of the second hollow body part and the first and second O-ring seals are disposed between the first and second hollow body parts where they mate at the first and second annular shoulders.

FIG. 2*a* also shows that a fluid-tight seal is achieved between the second hollow body part and the source of pressurised material by means of a screw fit via a male thread on the underside of the second hollow body part and a female thread within a top aperture of a vessel (not shown) containing the pressurised material, with a third O-ring seal (211) at the interface between the underside of the second hollow body part and the male thread, and the upper surface of the vessel containing the pressurised material.

Figure 3A:
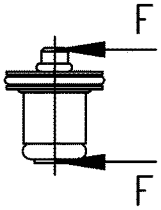
FIG. 3*a* is an external side view of a piston (which is located within the gas-operated valve of the invention shown in FIG. 1*a*) and a longitudinal cross-section of the piston along line F-F of FIG. 3*a;*
Figure 3B:
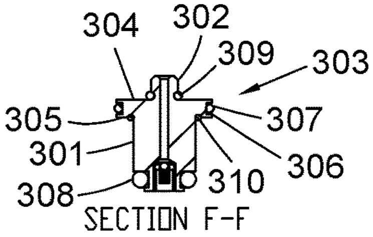
FIG. 3*b* is an external side view of a piston (which is located within the gas-operated valve of the invention shown in FIG. 1*b*) and a longitudinal cross-section of the piston along line F-F of FIG. 3*a;*

FIG. 3*a* shows an external side view of the piston and FIG. 3*b* is a longitudinal cross-section along line F-F of FIG. 3*a*. With reference to FIG. 3*b*, the piston comprises a primary cylindrical shaft (301) and a secondary cylindrical shaft (302) separated by a machined flange (303) including first (304) and second planar faces (305) and an annular recess (306) configured to receive a first piston seal (307) for providing a seal between the machined flange and the second hollow body part.

FIG. 3*b* also shows the longitudinal axial passage (205), which enables pressurisation of the source of material, and the one-way check valve (206). The longitudinal axial passage has a diameter of between 0.5 to 2 mm. In one embodiment, the piston does not comprise a one-way check valve in which case the diameter of the longitudinal axial passage is smaller and less than 0.5 mm. The longitudinal axial passage has a bottom end that has a greater diameter than the rest of the longitudinal axial passage and within which the check valve is situated.

The check valve (206) operates to only enable fluids, i.e. liquids or gases, to pass through the check valve in one direction towards the valve opening (106) without impediment. The check valve has both an inlet and an outlet port which are operable automatically without any manual intervention. Fluid may pass back though the check valve provided the difference in fluid pressure exceeds a predetermined differential pressure, or cracking pressure, for the inlet and/or outlet ports to open.

The piston additionally comprises a second piston seal (308) provided on the primary cylindrical shaft providing a seal between the primary cylindrical shaft and a fourth annular shoulder of the second hollow body part located towards the valve opening (106) when the piston is in a first axial position, i.e., when the piston is sealing the valve opening (106).

The piston additionally comprises a third piston seal (309) on or around the secondary cylindrical shaft providing a seal between the secondary cylindrical shaft and the first hollow body part when the piston is in a second axial position, i.e. when the piston has withdrawn from the valve opening (106).

The piston additionally comprises a fourth piston seal (310) provided at the junction between the primary cylindrical shaft and the machined flange and providing a seal between the junction and a third annular shoulder (212) of the second hollow body part when the piston is in the first axial position.

Optionally, the first, second and third O-ring seals (209, 210, 211), and the second, third and fourth piston seals (308, 309, 310) are provided in an annular notch in an outside or inside corner of one of the opposing interfaces thereby providing an improved seal compared to a seal provided between two flat surfaces. Without wishing to be being bound by theory, it is thought that the improvement in sealing is due to the formation of more than one interface between the compressed seal and the notch.

Figure 2B:
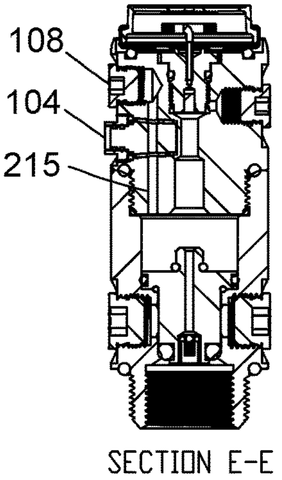
FIG. 2*b* is a longitudinal cross-sectional view of the embodiment of the gas-operated valve of the invention shown in FIG. 1*b* along the line E-E of FIG. 1*b;*

Turning now to FIG. 2*b*, this figure shows a longitudinal cross-sectional view of the embodiment of the gas-operated valve of the invention shown in FIG. 1*b* along the line E-E of FIG. 1*b*. The figure shows that the gas charge port (108) is in fluid communication via a gas charge passage (215) with the central chamber within the second hollow body part. FIG. 2*b* shows that the plug valve (104) controls the flow of gas through the gas charge passage.

Figure 4A:
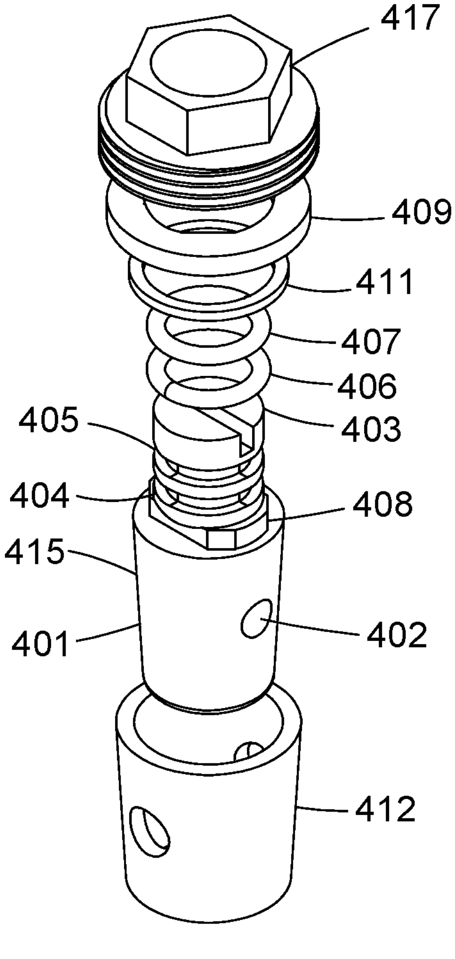
FIG. 4*a* is exploded view of a plug valve (which is located within the gas-operated valve of the invention shown in FIGS. 1*a* and 1*b*), with a plan view of a stop washer with an plug in-situ.

FIG. 4*a* is an exploded view of the plug valve (104). The plug valve comprises a plug (401), first and second plug valve O-ring seals (406, 407) and a stop washer (409).

The plug comprises, at one end, a stem (415) comprising a transverse bore (402) which is alignable with the gas charge passage thereby completing fluid communication between the gas charge port and the central chamber. The plug also comprises at an end distal from the stem a slot (403) suitable for a flat head screwdriver head which allows rotation of the plug from outside the gas-operated valve, and first and second annular grooves (404, 405) for the first and second plug valve O-ring seals (406, 407), and a partially facetted and partially curved waist portion (408), which rotationally and cooperatively interacts with an inside edge of the stop washer (409) between two end stop positions about 90 degrees apart, positioned between the slot and the stem with the waist portion nearest the stem. The two stop positions correspond to a position when the transverse bore (402) is aligned with the gas charge passage thereby completing fluid communication between the gas charge port and the central chamber, and a position when the transverse bore (402) is approximately at a right angle to the gas charge passage thereby blocking fluid communication between the gas charge port and the central chamber.

The stop washer also comprises a peripheral tab (410) which locks into a recess on the exterior of the first hollow body part (101) to prevent co-rotation of the combination of the plug and stop washer which would lead to rotation of the plug beyond the two end stop positions. One technical advantage of the tab being able to lock into the recess on the exterior of the first hollow body part is that the exterior appearance of the gas-operated valve of the invention is more compact in contrast to those valves with an externally fitted ball or other functionally equivalent valve.

FIG. 4*a* also shows that the plug valve includes a polytetrafluoroethylene (PTFE) washer (411) which lubricates axial rotational between the plug and the stop washer.

The plug valve also comprises a PTFE stem sleeve (412) and a blind bore (416) in the first hollow body part suitable for receiving the plug and stem sleeve, the stem sleeve providing a fluid-tight seal between the stem and a blind bore, thereby to prevent loss of fluid from the first hollow body part through the blind bore, whilst allowing the stem to rotate within the blind bore. The plug valve also comprises a retaining nut (417) for retaining the plug (401) within the blind bore (416).

The first and second plug valve O-ring seals (406, 407) provide fluid-tight seals between the plug (401) and the retaining nut (417).

Figure 4B:
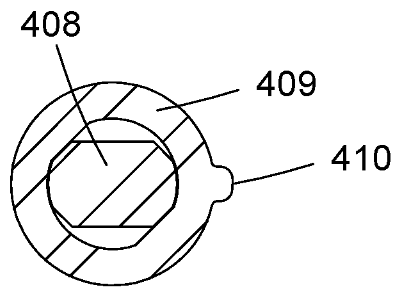
FIG. 4*b* is another view thereof.

FIG. 4*b* is a plan view of the stop washer with the plug in-situ. The inside edge of the stop washer presents a partially facetted and partially curved edge which cooperatively interacts with the corresponding rotating partially facetted and partially curved waist portion (408) of the plug in such a manner that the plug rotates between two stop positions about 90 degrees apart.

Figure 4D:
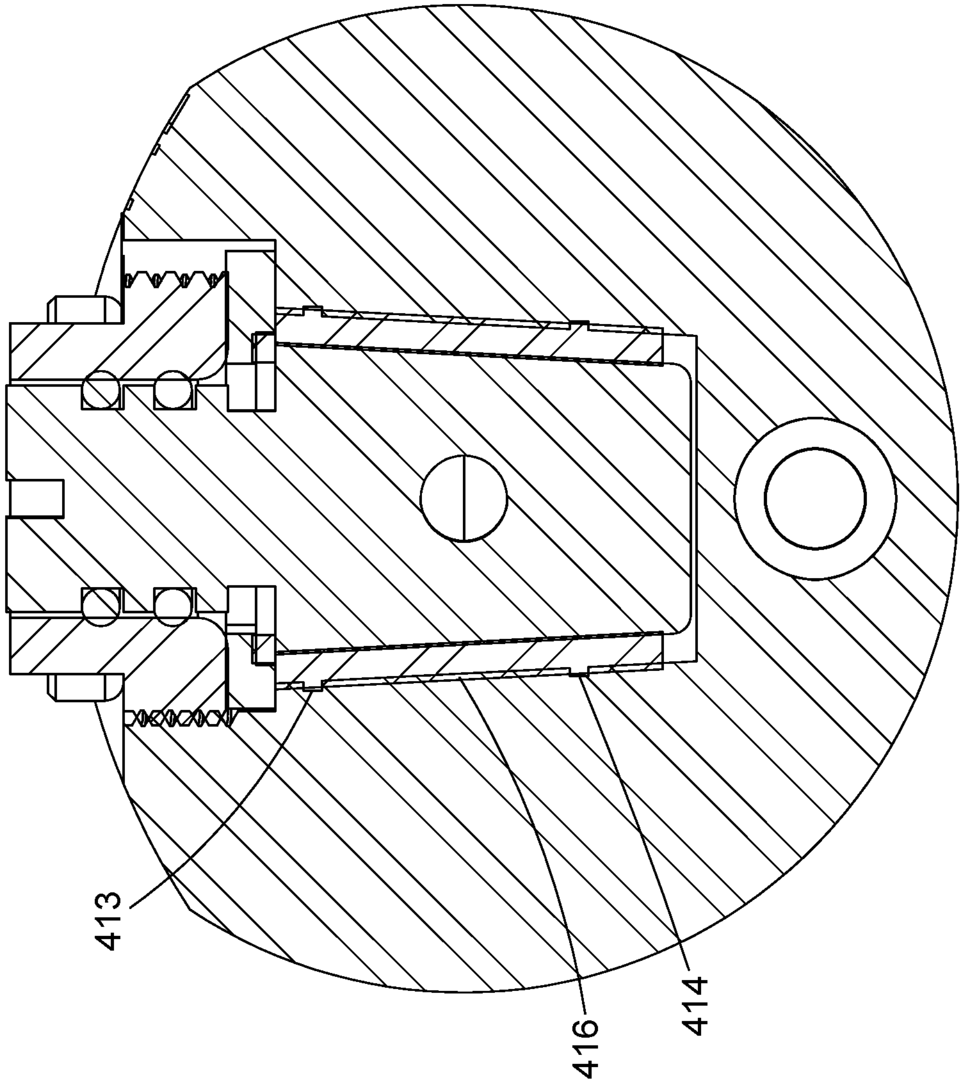
FIG. 4*d* is another view thereof.
Figure 4C:
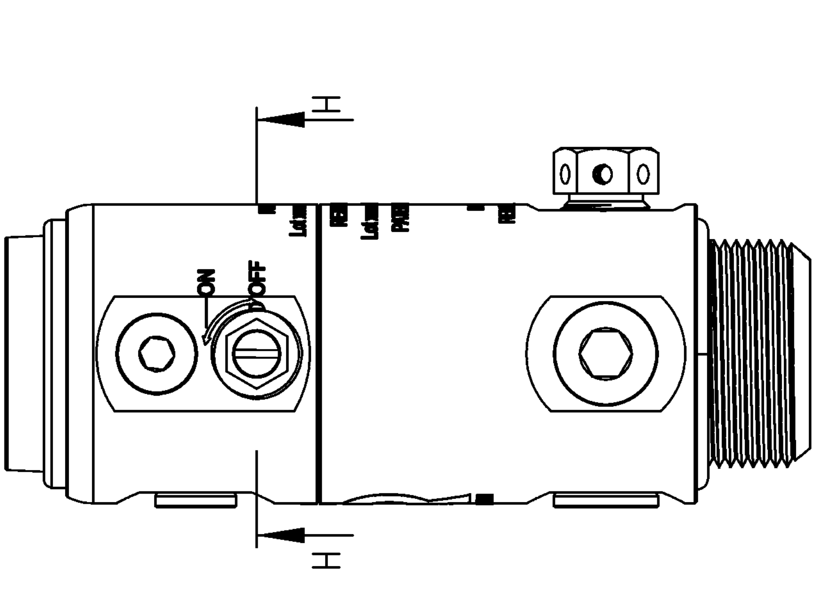
FIG. 4*c* is an external side view of the gas-operated valve of the invention in accordance with FIG. 1*b*, and an enlarged cross-section along line H-H.

FIG. 4*c* is a side view of the gas-operated valve of the invention in accordance with FIG. 1*b* and FIG. 4*d* is an enlarged cross-section along line H-H of FIG. 4*c*. FIG. 4*d* shows a pair of annular grooves (413, 414) in the inside wall of the blind bore (416). The stem sleeve is located between the stem and inside wall of the blind bore and a part thereof is received in the pair of annular grooves thereby enhancing the fluid-tight seal.

The gas-operated valve of the invention, with the exception of the seals, is typically fabricated from stainless steel, in particular grade 303 stainless steel. The seals, except where specifically specified, are typically made from rubbers such as styrene-butadiene rubbers polyisoprene, chloroprene, nitrile rubbers, ethylene propylene diene monomer rubber (EPDM), Viton™ fluoroelastomers, butyl rubber, silicone rubbers, chlorosulphonated polyethylene, and thermoplastic elastomers.

The gas-operated valve of the invention typically operate in the pressure range 20-200, 20-150, 20-100, 25-75, 25-65, 25-60, 25-40 bar gauge.

In use as part of, for example, a fire suppression system, cylinders are filled with fire suppression material and a gas-operated valve according to the invention fitted. The gas-operated valve optionally includes a siphon which protrudes from the valve opening (106) at the bottom of the second hollow body part (102) and which is inserted through the mouth of the cylinder. The lower end of the siphon comes to a rest near the bottom of the cylinder. The siphon ensures that the fire suppression material is effectively discharged through the gas-operated valve.

After the valve is fitted to the filled cylinder, the pressurised material ports are then connected to the tubing or piping for delivering the fire suppression and the gas ports connected to heat sensitive burst tubing or pipework, or sensor operated gas vents wherein the sensor can detect a fire or heat. The plug valve (104) is opened and a non-flammable gas is then charged through the gas charge port (108) into the central chamber (203) via the gas charge passage (215) forcing the piston to the first axial position with the second piston seal (308) provided on the primary cylindrical shaft providing a seal between the primary cylindrical shaft and the fourth annular shoulder of the second hollow body part located towards the valve opening (106) and the fourth piston seal (310) provided at the junction between the primary cylindrical shaft and the machined flange providing a seal between the junction and the third annular shoulder (212) of the second hollow body part.

The non-flammable gas then simultaneously both passes through the longitudinal axial passage (205) and check valve (206) into the cylinder containing the fire suppression material pressurising it, and into the heat sensitive burst tubing or pipework, or sensor operated gas vent wherein the sensor can detect a fire or heat via the central passage (202) so that the pressure on both sides of the piston are equal. Charging with non-flammable gas is then terminated by closing the plug valve (104).

Once charged, only a small trickle of non-flammable gas may pass back through the longitudinal axial passage (205) and check valve (206) from the cylinder containing the fire suppression material and into the central chamber (203) of the second hollow body part to compensate for any loss of non-flammable gas through the heat sensitive burst tubing or pipework, or sensor operated gas vents wherein the sensor can detect fire or heat. The check valve effectively prevents any fire suppression material from contaminating the heat sensitive burst tubing or pipework, sensor operated gas vents wherein the sensor can detect fire or heat or central passage (202).

When a fire bursts a portion of the heat sensitive burst tubing or pipework or triggers a sensor operated gas vent wherein the sensor can detect a fire or heat, the pressure of the non-flammable gas in the central passage (202) and the central chamber (203) of the second hollow body part reduces 108 allowing the piston to rise to a second axial position wherein the third piston seal (309) on or around the secondary cylindrical shaft provides a seal between the secondary cylindrical shaft and the first hollow body part. As the piston rises, fluid communication is established between the pressurised material ports and the cylinder of pressurised fire suppression material thereby permitting the fire suppression material to pass up the siphon and out though the pressurised material ports and the tubing or piping for delivering the fire suppression material to the fire source.

When the gas charge port (108) is in fluid connection with heat sensitive tubing or pipework or a sensor operated gas vent wherein the sensor can detect a fire or heat and the aforesaid heat sensitive tubing or pipework bursts or the sensor operated gas vent is triggered, the reduction in gas pressure in the central passage (202) and the central chamber (203) and hence the delay to release of the fire suppression material from the cylinder can be controlled by having adjusted the position of the stem (401) of the plug valve (104) to vary the rate at which non-flammable gas can pass through the transverse bore (402). Suitable adjustment of the stem (401) can delay release of the fire suppression material from the cylinder by 1-20 seconds. One advantage of delaying release of the fire suppression material is, in combination with an alarm system, to allow safe evacuation of the area surrounding the source of the fire before release of the fire suppression material.

In one embodiment of the invention, combinations of cylinder and gas-operated valve may be arranged in series connected via gas ports. Optionally, each cylinder and gas-operated valve combination can be fitted with heat sensitive tubing or pipework or a sensor operated gas vent to each gas charge port (108) and the position of the stem (401) of each plug valve (104) adjusted to release fire suppression material from the cylinder at different times.

The invention claimed is:

1. A gas-operated valve for a fire suppression system, the gas-operated valve comprising:

a body, a piston, and an integrated plug valve, the body configured to receive the piston axially therein, and the piston being movable within the body between a first axial position in which the piston is configured to seal a valve opening when pneumatic pressure provided by a non-flammable gas is applied to the piston and a second axial position in which the piston is configured to be withdrawn from the valve opening such that a pressurised fire suppression material can enter the body through the valve opening, wherein the piston comprises a machined flange which defines volumes for non-flammable gas and pressurised fire suppression material respectively separated by the machined flange, the integrated plug valve configured to control application and release of the pneumatic pressure and indirectly discharge of the fire suppression material, wherein the plug valve comprises a rotatable plug comprising a stem with a transverse bore for passage of the non-flammable gas, a blind bore in the body configured to receive the stem, and a stem seal between the stem and blind bore providing a fluid-tight seal between the stem and the blind bore thereby to prevent reduction of the pneumatic pressure by escape of the non-flammable gas between the stem and blind bore and allowing the stem to rotate within the blind bore, and wherein the blind bore comprises at least one or two annular grooves on an inside surface of the blind bore for receiving a portion of the stem seal thereby providing a further fluid-tight seal.

2. The gas-operated valve for a fire suppression system according to claim 1, wherein the stem seal is formed from polytetrafluoroethylene (PTFE).

3. The gas-operated valve for a fire suppression system according to claim 1, the plug valve comprising at least one O-ring seal providing a fluid-tight seal between the plug and a retaining nut for retaining the plug within the blind bore.

4. The gas-operated valve for a fire suppression system according to claim 1, wherein the plug valve comprises a stop washer, wherein the stop washer comprises an inside edge which is partially facetted and partially curved adapted to cooperatively interact with a corresponding partially facetted and partially curved waist portion of the plug in such a manner that the plug rotates between two stop positions, and wherein the stop washer further comprises a peripheral tab for preventing co-rotation of the combination of the plug and stop washer beyond the two end stop positions, the peripheral tab configured to lock into a recess on the exterior of the body.

5. The gas-operated valve for a fire suppression system according to claim 1, wherein the gas-operated valve further comprises first and second hollow body parts, wherein the second hollow body part receives the piston, and wherein a fluid-tight seal is achieved between the first and second hollow body parts by means of a screw fit comprising a male thread on the first hollow body part and a female thread on the second hollow body part, the second hollow body part further comprising first and second annular shoulders, and first and second O-ring seals disposed between the first and second hollow body parts where they mate at the first and second annular shoulders.

6. The gas-operated valve for a fire suppression system according to claim 1, wherein the gas-operated valve further comprises a gas charge port for pressurising the gas-operated valve and for fitting heat sensitive burst tubing or pipework, or a sensor operated gas vent wherein the sensor can detect a fire, wherein the gas charge port is in fluid communication via a gas charge passage with the volume for non-flammable gas, wherein the plug valve controls passage of the non-flammable gas through the gas charge passage, wherein the gas-operated valve further comprises at least one pressurised material port for tubing or pipework for delivering fire suppression material to the source of fire, and wherein the gas-operated valve optionally further comprises at least one gas port for heat sensitive burst tubing or pipework, or a sensor operated gas vent wherein the sensor can detect a fire, the gas port being in fluid communication with the volume for non-flammable gas.

7. The gas-operated valve for a fire suppression system according to claim 1, wherein the plug valve comprises a stop washer for cooperating with the plug to limit rotation between the stop washer and plug between two stop positions, the stop washer comprising a peripheral tab for preventing co-rotation of the stop washer with the plug, the peripheral tab adapted to lock into a recess on the outside of the body.

8. The gas-operated valve for a fire suppression system according to claim 5, wherein the piston comprises a primary cylindrical shaft and a secondary cylindrical shaft separated by a machined flange including first and second planar faces and an annular recess configured to receive a first piston seal for providing a seal between the machined flange and the second hollow body part, wherein the piston additionally comprises a second piston seal provided on the primary cylindrical shaft providing a seal between the primary cylindrical shaft and a fourth annular shoulder of the second hollow body part located towards the valve opening when the piston is in the first axial position, wherein the piston additionally comprises a third piston seal on or around the secondary cylindrical shaft providing a seal between the secondary cylindrical shaft and the first hollow body part when the piston is in the second axial position, and wherein the piston additionally comprises a fourth piston seal provided at the junction between the primary cylindrical shaft and the machined flange and providing a seal between the junction and a third annular shoulder of the second hollow body part when the piston is in the first axial position.

9. The gas-operated valve for a fire suppression system according to claim 1, wherein the piston comprises a longitudinal axial passage for pressurisation of the fire suppression material, and optionally a one way check valve within the longitudinal axial passage which only enables fluids to pass through in one direction without impediment towards the valve opening and to pass back though the check valve only provided the difference in fluid pressure either side of the check valve exceeds a predetermined differential pressure.

10. The gas-operated valve for a fire suppression system according to claim 5, wherein at least one of the first and second O-ring seals are provided in an annular corner notch.

11. The gas-operated valve for a fire suppression system according to claim 1, wherein the gas-operated valve further comprises a burst plug in fluid communication via a burst plug passage with the pressurised fire suppression material.

12. The gas-operated valve for a fire suppression system according to claim 1, wherein the gas-operated valve has an operating pressure range of 20-200, 20-150, 20-100, 25-75, 25-65, 25-60, 25-40 bar gauge.

13. A fire suppression system, comprising: a gas-operated valve according to claim 1, a detection means for detecting the presence of a fire or abnormal heat, a non-flammable gas source for maintaining the gas-operated valve in a normal operating condition, a source of fire suppression material connected to the gas-operated valve, and tubing or pipework for delivering fire suppression material to the source of fire, wherein detection of a fire or abnormal heat by the detection means automatically causes non-flammable gas pressure in the gas-operated valve to be reduced or removed resulting in release of the fire suppression material from the source of the fire suppression material to the gas-operated valve and thence via the tubing or pipework for delivering fire suppression material to the source of fire or heat.

14. The fire suppression system according to claim 13, further comprising at least two gas-operated valves in fluid communication in series each with a source of fire suppression material, wherein removal of non-flammable gas pressure in one gas-operated valve results in reduction or removal of non-flammable gas pressure in all the gas-operated valves.

15. A method of operating a fire suppression system, the method comprising the step of providing a fire suppression system, the fire suppression system comprising a gas-operated valve according to claim 6, a detection means for detecting the presence of a fire or abnormal heat, a non-flammable gas source for maintaining the gas-operated valve in a normal operating condition, a source of fire suppression material connected to the gas-operated valve, and tubing or pipework for delivering fire suppression material to the source of fire, wherein detection of a fire or abnormal heat by the detection means automatically causes non-flammable gas pressure in the gas-operated valve to be reduced or removed via the gas charge port resulting in release of the fire suppression material from the source of the fire suppression material to the gas-operated valve and thence via the tubing or pipework for delivering fire suppression material to the source of fire or heat, and wherein the method comprises the further step of adjusting the position of the rotatable plug thereby to control the rate of loss of non-flammable gas and delay release of the fire suppression material from the source of the fire suppression material to the gas-operated valve and thence via the tubing or pipework for delivering fire suppression material to the source of fire or heat.

* * * * *